(12) United States Patent
Lewis et al.

(10) Patent No.: US 8,609,171 B2
(45) Date of Patent: Dec. 17, 2013

(54) CIRCUMFERENTIAL PASTEURIZER

(75) Inventors: David K. Lewis, Salinas, CA (US); Ravi Kulkarni, Salinas, CA (US)

(73) Assignee: Fresh Express Incorporated, Charlotte, NC (US)

(*) Notice: Subject to any disclaimer, the term of this patent is extended or adjusted under 35 U.S.C. 154(b) by 561 days.

(21) Appl. No.: 12/705,446

(22) Filed: Feb. 12, 2010

(65) Prior Publication Data

US 2011/0200730 A1 Aug. 18, 2011

(51) Int. Cl.
*A23L 3/18* (2006.01)
*A23L 3/00* (2006.01)

(52) U.S. Cl.
USPC .............................. 426/521; 426/519; 99/483

(58) Field of Classification Search
USPC ............ 426/519, 521; 99/493, 534, 584, 483; 34/109, 112, 114, 115
See application file for complete search history.

(56) References Cited

U.S. PATENT DOCUMENTS

| | | | |
|---|---|---|---|
| 790,580 A | 5/1905 | Kurtz | |
| 1,231,002 A | 6/1917 | Dawson | |
| 1,231,022 A | 6/1917 | Headley | |
| 1,352,702 A | 9/1920 | Townsend | |
| 1,961,314 A * | 6/1934 | Wall | 34/109 |
| 2,013,522 A | 9/1935 | Mills | |
| 2,287,014 A | 6/1942 | Allan | |
| 2,537,053 A | 1/1951 | Hemmeter | |
| 3,049,986 A | 8/1962 | Weber | |
| 3,972,279 A * | 8/1976 | Powers | 99/516 |
| 4,062,277 A * | 12/1977 | Powers | 99/483 |
| 4,125,066 A * | 11/1978 | Stokes | 99/534 |
| 4,517,992 A * | 5/1985 | Korte et al. | 131/304 |
| 7,980,002 B2 * | 7/2011 | Eichler | 34/359 |
| 2009/0293741 A1 * | 12/2009 | Reiff et al. | 99/570 |

* cited by examiner

*Primary Examiner* — Steven Leff
*Assistant Examiner* — Jianying Atkisson
(74) *Attorney, Agent, or Firm* — Kilpatrick Townsend & Stockton LLP

(57) ABSTRACT

Circumferential pasteurizers and related methods are disclosed. A circumferential pasteurizer includes a vessel having an inner guide surface, a thermal medium inlet disposed on a first side of the vessel, a thermal medium outlet disposed on a second side of the vessel, a food product inlet disposed on the second side of the vessel, a food outlet disposed on the first side of the vessel, and a rotating paddle wheel suspended for rotation in the vessel. The paddle wheel includes a hub and a plurality of paddles distributed around the hub and extending outwardly therefrom to adjacent the vessel inner guide surface to form food receiving pockets extending the length of the hub. The paddle wheel conveys the food product from the food product inlet to the food product outlet along the vessel inner guide surface and counter to the flow of the thermal medium.

20 Claims, 6 Drawing Sheets

CIRCUMFERENTIAL PASTEURIZER

BACKGROUND

This invention relates generally to apparatus and methods for treating or coating a product with a working fluid or gas, and more particularly to apparatus and methods for pasteurizing and/or blanching food products.

Pasteurization and blanching of food products employ heat to kill harmful bacteria and enzymes thus improving food safety, shelf life, appearance, and quality. Often, the source of heat is steam or hot water. Typically, the food product is held at a specific time and temperature in a fluid medium to achieve the desired effect.

Existing apparatus for pasteurizing and blanching products employ a variety of approaches for subjecting the food product to heat. For example, some apparatus use a horizontal conveyor belt to transport the product through an insulated chamber where injected steam, a hot water bath, or hot water spray heat the product. Belt width, chamber length, product bed depth, and belt speed determine retention time and capability. Air locks, water baths, gates, and other means are used to contain steam in the chamber. As another example, some apparatus use a rotary-screw conveyor to transport the product through a cylindrical trough containing hot water. Often, a series of paddles at the end of the screw lift the product out of the trough.

While the existing approaches used for the pasteurization and blanching of food products can be effectively employed, further improvements remain desirable.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Circumferential pasteurizers and related methods are provided for pasteurization and blanching of food products. In many embodiments, a circumferential pasteurizer uses a rotating paddle wheel suspended for rotation in a vessel containing a thermal medium. The paddle wheel includes a plurality of paddles distributed around a central hub and extending outwardly therefrom to form food receiving pockets. Rotation of the paddle wheel transports the food product through the thermal medium in the vessel. The thermal medium is introduced into the vessel, and extracted from the vessel, so that the thermal medium flows counter to the direction of transport of the food product through the vessel. The thermal medium extracted can be heated and filtered before reintroduction into the vessel. Such a circumferential pasteurizer can advantageously be configured to occupy a small amount of floor space, have low capital cost, have low maintenance costs, have low operating costs, be easy and quick to clean, and require a relatively short amount of time to change the food product being pasteurized due to a relatively small volume of food product being processed at any one time. The counter flow of the thermal medium with respect to the transport of the food product provides for efficient pasteurization of the food product.

Thus, in a first aspect, a circumferential pasteurizer is provided. The circumferential pasteurizer includes a vessel having an inner guide surface and containing a thermal medium, a thermal medium inlet disposed on a first side of the vessel to inlet the thermal medium, a thermal medium outlet disposed on a second side of the vessel opposite the first side to outlet the thermal medium, a food product inlet disposed on the second side of the vessel to introduce a food product to be pasteurized, a food outlet disposed on the first side of the vessel to remove the food product after pasteurization, and a rotating paddle wheel suspended for rotation in the vessel through the thermal medium. The rotating paddle wheel includes a hub and a plurality of paddles distributed around the hub and extending outwardly therefrom to adjacent the vessel inner guide surface to form food receiving pockets extending the length of the hub. The food receiving pockets convey the food product from the food product inlet to the food product outlet along the vessel inner guide surface and counter to the flow of the thermal medium from the thermal medium inlet to the thermal medium outlet. In many embodiments, the vessel inner guide surface includes a cylindrical surface.

In many embodiments, the circumferential pasteurizer includes a fluid circuit in fluid communication with the thermal medium inlet and the thermal medium outlet to re-circulate the thermal medium from the outlet to the inlet. The fluid circuit can include, for example, a pump, a filter, and/or a heat exchanger to add heat to the thermal medium.

The circumferential pasteurizer can be configured to generate uniform flow of the thermal medium through the vessel. For example, the thermal medium inlet can be configured to distribute the introduction of the thermal medium along the length of the hub and the thermal medium outlet can be configured to distribute the outlet of the thermal medium along the length of the hub.

The outwardly extending paddles can be configured to generate uniform flow of the thermal medium through the vessel. For example, each of the paddles can include a plurality of apertures through which the thermal medium flows. Each of the paddles can include a plurality of outwardly extending members distributed along the length of the hub separated by intermediate spaces.

The circumferential pasteurizer can include an extraction comb to extract the food product from the food receiving pockets. The extraction comb can be coupled with the vessel and disposed adjacent to the food outlet. The extraction comb can include a plurality of elongated curved members configured to pass through intermediate spaces in the outwardly extending paddles as the paddle wheel rotates to extract the food product from the food receiving pockets.

The circumferential pasteurizer can include inlet and outlet mechanisms to convey food to and from the pasteurizer. For example, the circumferential pasteurizer can include a food inlet chute communicating with the food product inlet, and a food outlet chute communicating with the food product outlet. An inlet gate can be coupled with the food inlet chute to control the introduction of the food product through the food product inlet. An outlet gate can be coupled with the food outlet chute and configured to inhibit heat escape.

The circumferential pasteurizer can be configured to coordinate the rotation of the paddle wheel with the introduction and discharge of food product into and from the pasteurizer. For example, the circumferential pasteurizer can include a drive mechanism operatively coupled with the rotating paddle wheel and configured to intermittently rotate the paddle wheel through an angle corresponding to the distribution of paddles around the hub to position one of the paddles to receive food product introduced through the food product inlet and to position one of the paddles to discharge food product through the food product outlet. The paddles can be oriented to align with an inlet chute when receiving the food product and align with an outlet chute when discharging the food product. The drive mechanism can include a ratchet to intermittently rotate the paddle wheel. The circumferential pasteurizer can include an in-feed conveyor communicating with the food product inlet and configured to introduce the food product in timed coordination with the intermittent rotation of the paddle wheel.

In another aspect, a method for pasteurizing food is provided. The method includes introducing a food product into a vessel having an inner guide surface adjacent a first location along the inner guide surface, introducing a thermal medium into the vessel at a second location along the inner guide surface, removing the thermal medium from the vessel at the first location, moving the food product through the vessel along the inner guide surface from the first location to the second location, and removing the food product from the vessel adjacent the second location. In many embodiments, the method includes rotating a paddle wheel to push the food product along the inner guide surface.

In many embodiments, the method includes re-circulating the thermal medium through a fluid circuit from the first location to the second location. In many embodiments, the method includes filtering the thermal medium prior to introduction at the second location. In many embodiments, the method includes heating the thermal medium prior to introduction at the second location.

For a fuller understanding of the nature and advantages of the present invention, reference should be made to the ensuing detailed description and accompanying drawings.

DETAILED DESCRIPTION

In the following description, various embodiments of the present invention will be described. For purposes of explanation, specific configurations and details are set forth in order to provide a thorough understanding of the embodiments. However, the present invention can be practiced without the specific details. Furthermore, well-known features may be omitted or simplified in order not to obscure the embodiment being described.

Figure 1:
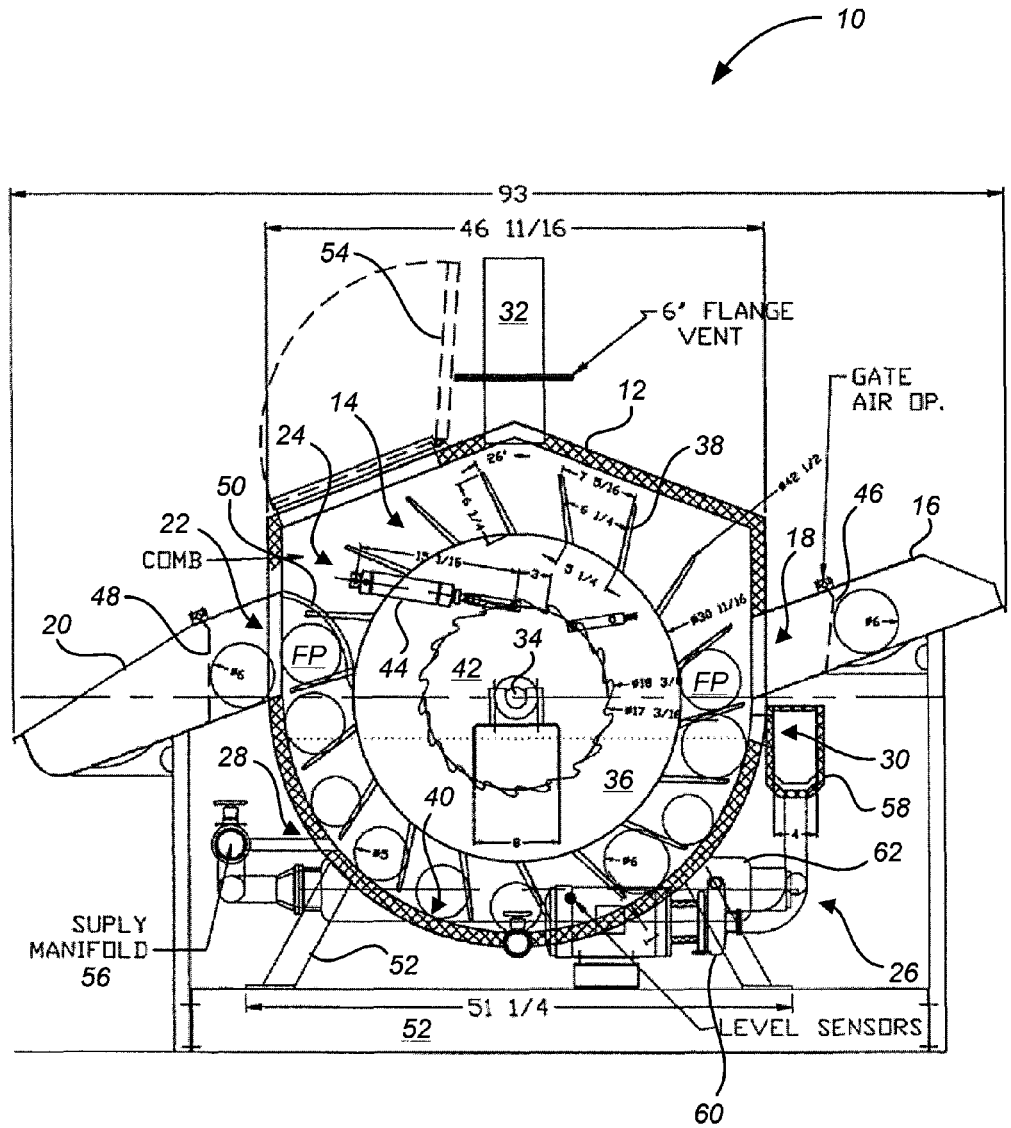
FIG. 1 is a front-view illustration of a circumferential pasteurizer in accordance with many embodiments.

Referring now to the drawings, in which like reference numerals represent like parts throughout the several views, FIG. 1 shows a circumferential pasteurizer 10 in accordance with many embodiments. The pasteurizer 10 includes a vessel 12, a rotating paddle wheel 14 suspended for rotation in the vessel 12 about an axis of rotation, a food product inlet chute 16 in communication with a food product inlet 18, a food product outlet chute 20 in communication with a food product outlet 22, a drive mechanism 24 operatively coupled with the rotating paddle wheel 14, a thermal medium re-circulation circuit 26 in communication with a thermal medium inlet 28 and a thermal medium outlet 30 to re-circulate a thermal medium from the thermal medium outlet 30 to the thermal medium inlet 28, and an exhaust vent 32. The paddle wheel 14 includes a central shaft 34 that is supported by front and back bearings that are supported by front and back walls of the vessel 12, respectively.

The paddle wheel 14 includes a central hub 36 coupled with the central shaft 34 and a plurality of paddles 38 radially extending from the central hub 36 to adjacent an inner guide surface 40 of the vessel 12. The central hub 36 and the paddles 38 have a width in the direction of the axis of rotation of the paddle wheel 14. The lower portion of the vessel 12 has a cylindrical shape that defines the inner guide surface 40. The inner guide surface 40 has a cylindrical shape, which provides for a uniform clearance between the tips of the paddles 38 and the inner guide surface 40. The central hub 36, the paddles 38, and the inner guide surface 40 define a plurality of food product receiving pockets that move the food product (FP) along the inner guide surface 40 between the food product inlet 18 and the food product outlet 22 as the paddle wheel 14 rotates about its axis of rotation. The food receiving pockets are bounded by vessel front and back walls disposed to the front and the rear of the paddle wheel 14.

The paddles 38 are distributed around the central hub 36 and oriented relative to the central hub 36 so that at particular angular orientations of the paddle wheel 14 relative to the vessel 12 a paddle 38 aligns with the inlet chute 16 when another paddle 38 aligns with the outlet chute 20. The drive mechanism 24 is coupled with the paddle wheel 14 and is configured to intermittently rotate the paddle wheel 14 through an angle corresponding to the spacing between the paddles 38. The drive mechanism 24 illustrated includes a ratchet component 42 actuated by a pneumatic air cylinder 44. Other drive mechanism can be used, for example, an electric or hydraulic motor connected to the paddle wheel 14 through a gear reducer.

A suitable control system can be used to control the motion of the drive mechanism 24 so as to generate the intermittent rotation desired. Such a control system can employ, for example, a proximity switch or a photo-eye to sense paddle location. A drive motor, for example, an electric motor or a hydraulic motor, can be used to rotate the central shaft 34 through a gear reducer so as to index the paddles 38 one position (e.g., through 360 degrees divided by the number of paddles). The drum can then remain stationary for a time period related to the desired exposure time of the product (e.g., 120 seconds retention/10 pockets submerged=12 seconds per index, 12 seconds/index−3 seconds rotation time=9 seconds dwell). Timers or a programmable logic controller (PLC) can be used to control the drive motor via, for example, a motor starter or a hydraulic valve.

In operation, the paddle wheel 14 is held stationary during intermittent time periods with a paddle 38 aligned with the inlet chute 16 and a paddle 38 aligned with the outlet chute 20 so that a food product (FP) from the inlet chute 16 can be placed into a food receiving pocket at the same time a food product (FP) can be removed from a food receiving pocket for movement along the outlet chute 20. The inlet chute 16 includes an inlet gate 46 that is actuated in timed coordination with the intermittent rotation of the paddle wheel 14 so as to release a food product (FP) along the inlet chute 16 at a suitable time for introduction into a food receiving pocket. Similarly, the outlet chute 20 includes an outlet gate 48 that can be actuated in timed coordination with the intermittent rotation of the paddle wheel 14 so as to release a food product (FP) along the outlet chute 20. In addition to their food product movement control function, the inlet gate 46 and the outlet gate 48 also serve to inhibit heat escape from the vessel 12.

In between the intermittent stationary periods, the drive mechanism 24 rotates the paddle wheel 14 (clockwise in FIG. 1). The rotation of the paddle wheel 14 moves the food product (FP) in the food receiving pockets along the inner guide surface 40 from the food product inlet 18 to the food product outlet 22.

An extraction comb 50 is coupled with the vessel 12 and disposed adjacent the food product outlet 22 to aid in the removal of the food product (FP) from the food receiving pockets. The extraction comb 50 include a plurality of curved fingers configured to pass through radial spaces in the paddles 38. The extraction comb forces food product that does not roll freely off the paddles out of the vessel under the influence of gravity alone. A common shaft supporting teeth of the extraction comb can be spring loaded to maintain the tips of the extraction comb teeth in close contact with the central hub 36.

The vessel 12 is supported via a support structure 52, and includes an access door 54 disposed on a top surface of the vessel 12. The support structure 52 supports the inlet chute 16 and the outlet chute 20.

The thermal medium re-circulation circuit 26 circulates the thermal medium through the vessel 12 by injecting heated thermal medium into the vessel 12 at the thermal medium inlet 28 and removing thermal medium from the vessel 12 at the thermal medium outlet 30. The thermal medium inlet 28 is positioned adjacent the food product outlet 22. And the thermal medium outlet 30 is positioned adjacent the food product inlet 18. This arrangement results in the thermal medium flowing in the vessel 12 between the central hub 36 and the inner guide surface 40 in a direction opposite to the movement of the food product (FP) along the inner guide surface 40. Such a counter flow of thermal medium provides for an efficient use of heat by subjecting the food product (FP) to increasing temperatures as the food product (FP) moves along the inner guide surface 40.

The thermal medium re-circulation circuit 26 includes a supply manifold 56 to distribute the introduction of thermal medium into the vessel 12 along the front to back width of the vessel 12, and an outlet manifold 58 to distribute the removal of thermal medium from the vessel 12 along the front to back width of the vessel 12. The thermal medium re-circulation circuit 26 further includes a pump 60 to circulate the thermal medium and a heat exchanger 62 to add heat to the thermal medium. In many embodiments, the thermal medium includes heated water. Other thermal mediums can also be used, for example, steam.

The exhaust vent 32 can be used to prevent fumes from the pasteurizer 10 from escaping into, for example, a building housing the pasteurizer 10. For example, when steam and/or hot water is used as the thermal medium, the steam or steam liberated from the hot water can be exhausted from the pasteurizer 10 through a duct connected to the exhaust vent 32. The duct can be used to transport the vented steam to outside of the building. A small fan located, for example, at the duct outlet can be used to create negative pressure at the exhaust vent 32. Air removed from the building can be replenished, for example, via a make up air system for the building. Because the volume of air removed can be limited to that required to remove the generated steam, relatively little make up air may be required.

Figure 2:
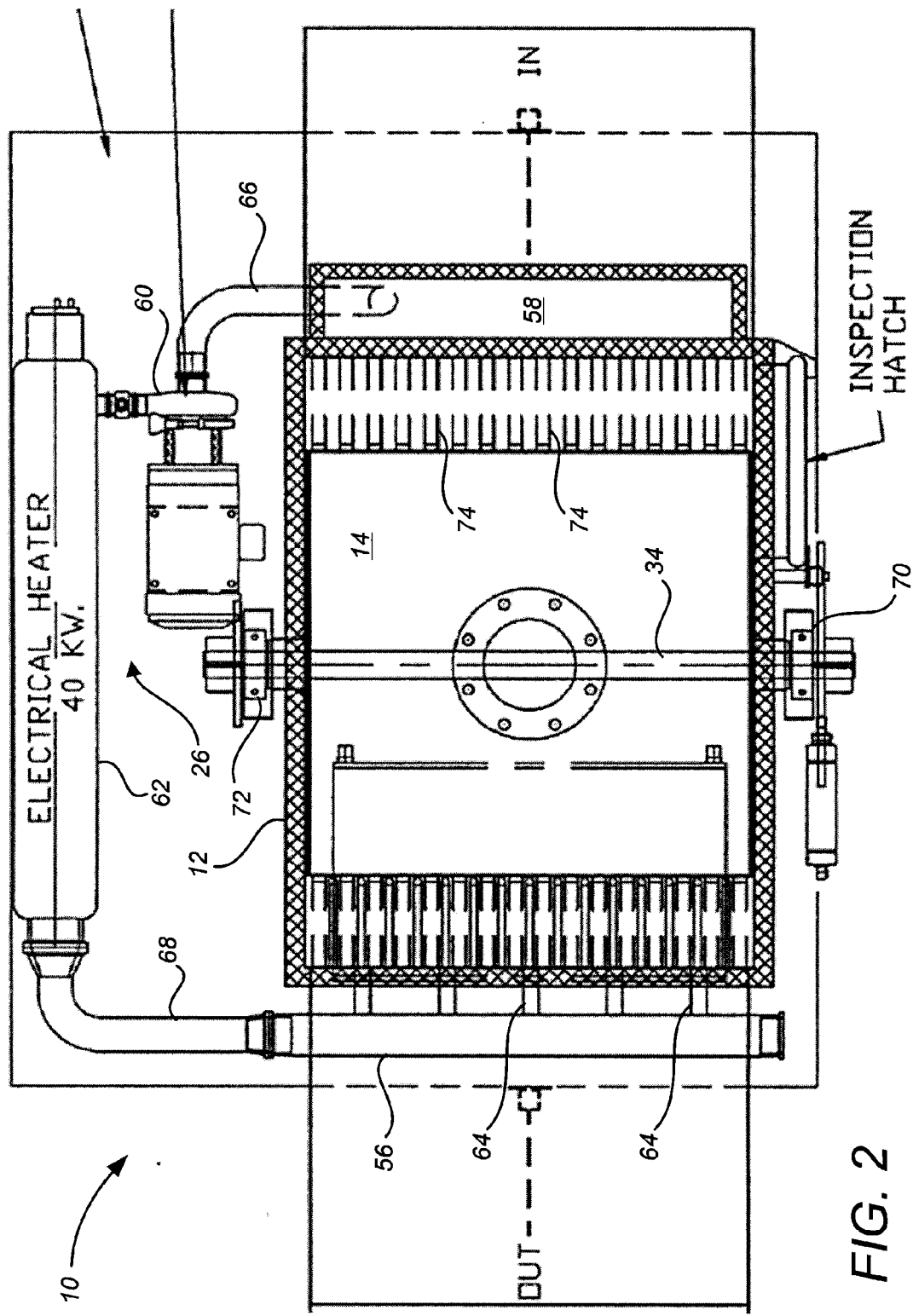
FIG. 2 is a plan-view illustration of the pasteurizer of FIG. 1.

The front to back distribution of the thermal medium introduction into the vessel 12 and the thermal medium removal from the vessel 12 is illustrated in FIG. 2. The supply manifold 56 communicates with the vessel 12 via inlet tubes 64 (e.g., two or more such as the five inlet tubes illustrated) that are distributed along the front to back width of the vessel 12. Similarly, the outlet manifold 58 is configured to remove thermal medium from the vessel along the front to back width of the vessel 12.

FIG. 2 shows the layout of the thermal medium re-circulation circuit 26. A transport pipe 66 transfers thermal medium from the outlet manifold 58 to the pump 60, which transfers the thermal medium to the heat exchanger 62. Heated thermal medium from the heat exchanger 62 is transferred to the supply manifold 56 via a transport pipe 68.

FIG. 2 also illustrates additional details of the paddle wheel 14. The central shaft 34 of the paddle wheel 14 is supported via a front support bearing 70 and a rear support bearing 72. Each of the paddles of the paddle wheel 14 include a plurality of radially-extending members 74 distributed along the front to back width of the paddle wheel 14 with intermediate spaces disposed between the radially-extending members 74. The curved fingers of the extraction comb (shown in FIG. 1) are configured to pass through the intermediate spaces during rotation of the paddle wheel 14.

Figure 3:
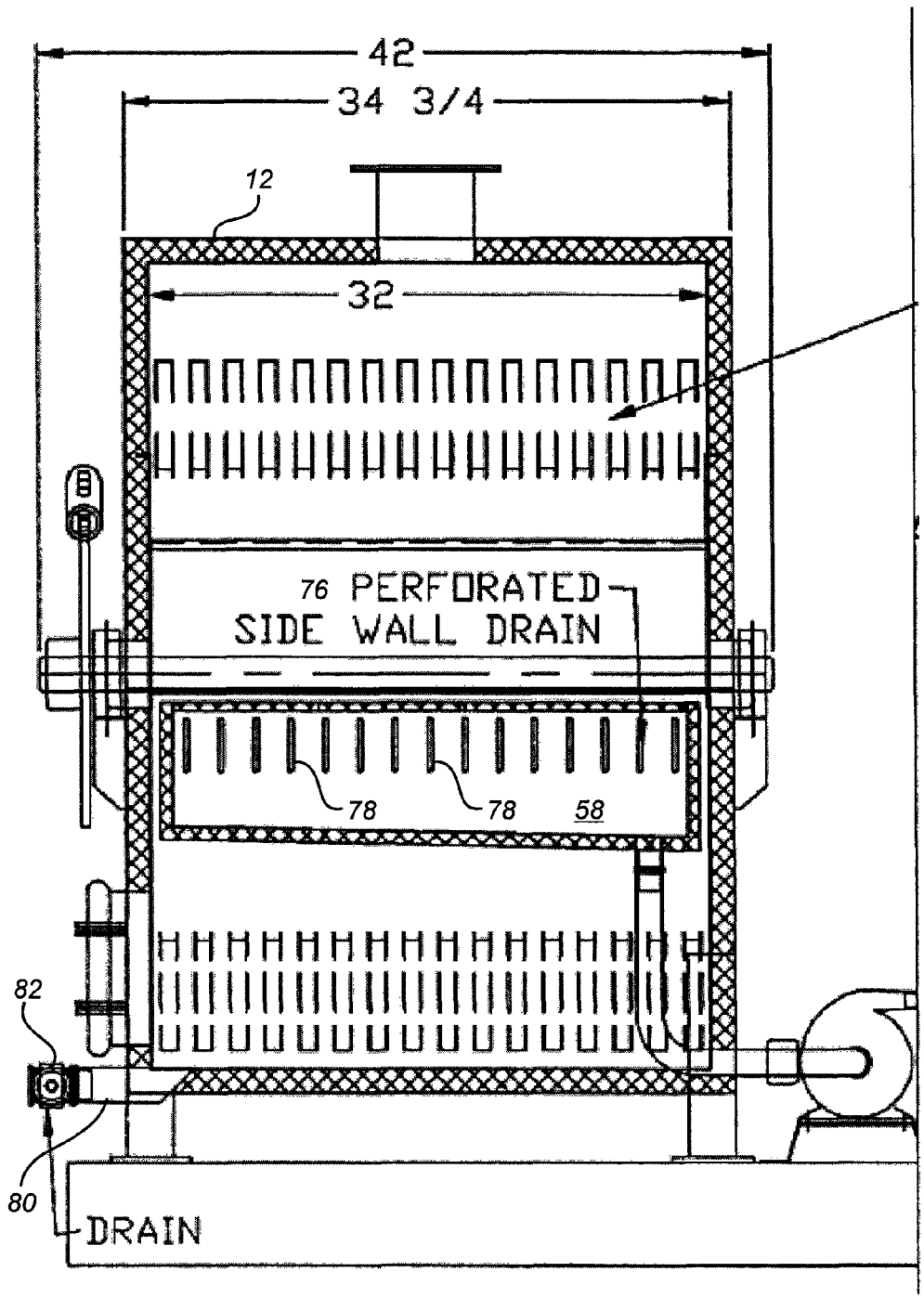
FIG. 3 is an inlet-chute side-view illustration of the pasteurizer of FIG. 1.

FIG. 3 illustrates details of a perforated side wall 76 of the vessel 12 through which thermal medium flows into the outlet manifold 58 from the vessel 12. The perforated side wall 76 contains a plurality of vertically-oriented apertures 78. The vertically-oriented apertures 78 can accommodate a range of thermal medium flow rates, and can be used to control the level of thermal medium within the vessel 12. For example, the total amount of fluid within the vessel 12 and the thermal medium re-circulation circuit can be controlled such that the fluid level in the outlet manifold 58 is controlled relative to the apertures 78 (e.g., via level sensors in the outlet manifold 58 and in the vessel 12 that are operatively coupled with a pump and/or a valve to add or remove fluid from the circulating fluid). With the fluid level in the outlet manifold 58 at, for example, the bottom or below the bottom of the apertures, the fluid level in the vessel 12 will be a function of the fluid re-circulation rate. When a relatively low recirculation rate is used, the fluid level in the vessel 12 adjacent the apertures 78 will be slightly above the bottom of the apertures 78. When a higher recirculation rate is used, the fluid level in the vessel 12 adjacent the apertures 78 will be correspondingly higher above the bottom of the apertures 78.

A drain pipe 80 in fluid communication with vessel 12 is positioned at the bottom of the vessel 12. A drain valve 82 is coupled with the drain pipe 80 and can be used to control the rate of flow of thermal medium through the drain pipe 80. Thermal medium can be added or removed from the circulating thermal medium via the drain pipe 80. For example, to remove thermal medium, the drain valve 82 can be opened and a desired quantity of thermal medium can be extracted from the vessel 12 (e.g., pumped, allowed to drain). Likewise, to add thermal medium, the drain valve 82 can be opened and a desired quantity of thermal medium can be injected into the vessel 12 (e.g., pumped). The drain valve 82 can be kept closed when thermal medium is not being added or removed from the vessel 12.

Figure 4:
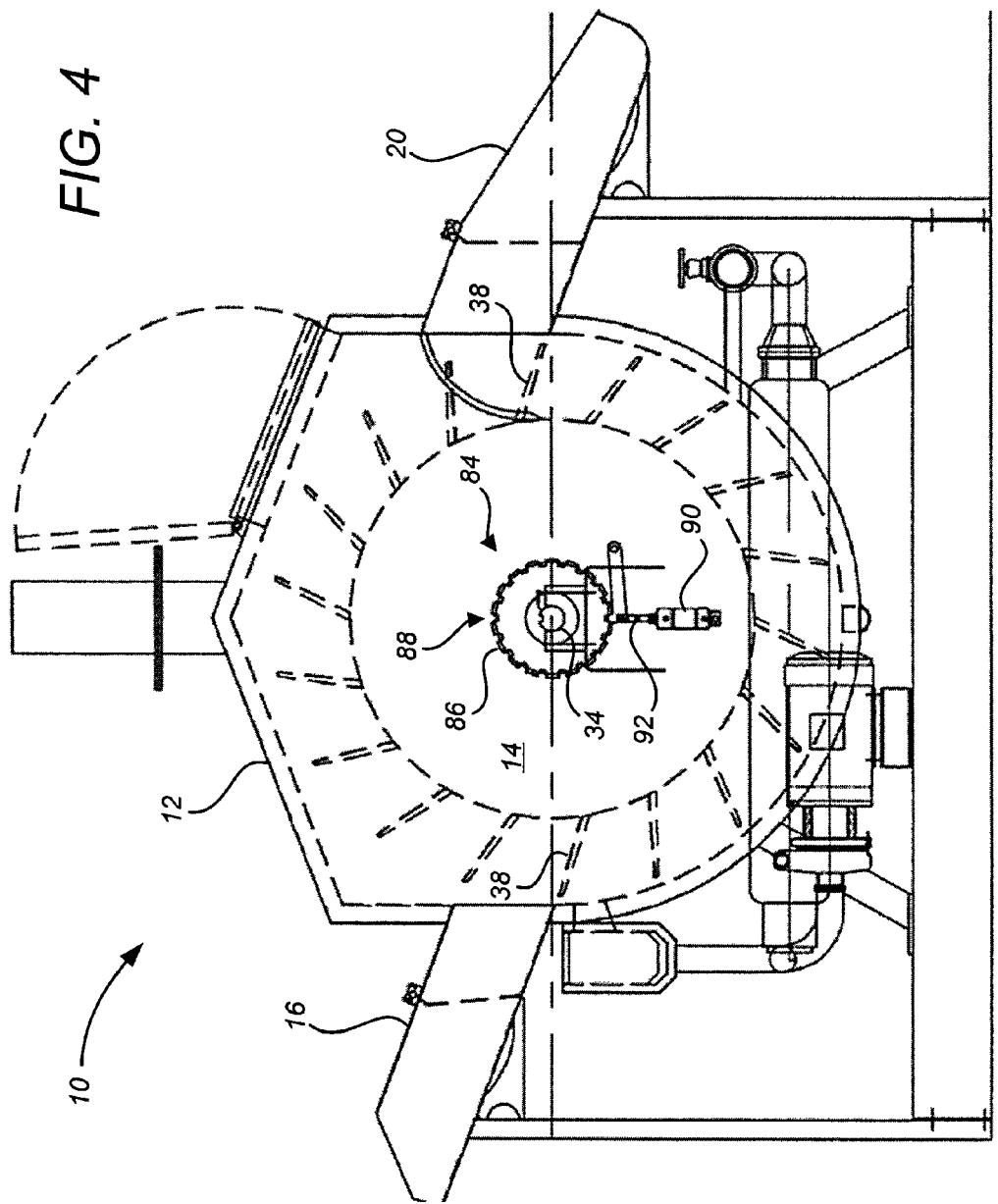
FIG. 4 is a rear-view illustration of the pasteurizer of FIG. 1.

FIG. 4 illustrates the back side of the pasteurizer 10. A detent mechanism 84 is coupled with the central shaft 34. The detent mechanism 84 includes a notched disk 86 attached to the central shaft 34 and having a plurality of notches 88 distributed around a perimeter of the notched disk 86, and a pneumatic cylinder 90 attached to the vessel 12 that actuates a shaft 92 so that the shaft 92 selectively engages and disengages from one of the notches 88. When engaged with one of the notches 88, the shaft 92 prevents rotation of the paddle wheel 14. Each notch of the plurality of notches 88 is positioned such that when engaged by the shaft 92, a paddle 38 aligns with the inlet chute 16 and a paddle 38 aligns with the outlet chute 20.

Figure 5:
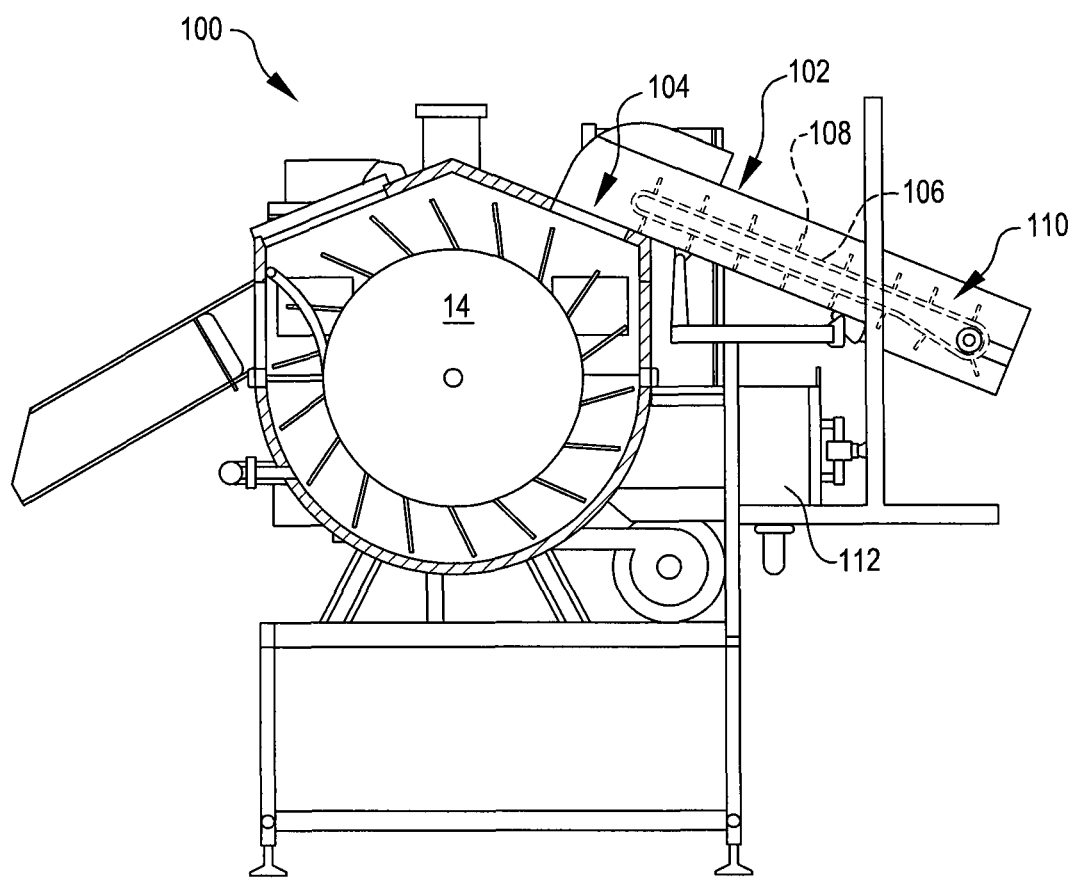
FIG. 5 is a front-view illustration of a circumferential pasteurizer having an in-feed conveyor, in accordance with many embodiments.

FIG. 5 shows a circumferential pasteurizer 100 that includes an in-feed conveyor 102, in accordance with many embodiments. The pasteurizer 100 is configured similar to the above-described pasteurizer 10 of FIG. 1. As such, description of similar components will be omitted. Although similar, the pasteurizer 100 is different from the pasteurizer 10. For example, the pasteurizer 100 includes the in-feed conveyor 102 to transfer the food product through a food inlet 104 and into the food receiving pockets of the paddle wheel 14. The in-feed conveyor 102 is a powered indexing conveyor. The in-feed conveyor 102 includes a conveyor belt 106 having partitions 108 to form food product receiving pockets 110. Each of the food receiving pockets 110 of the in-feed conveyor 102 is configured to transfer a quantity of food product suitable for one of the food receiving products of the paddle wheel 14. In operation, the in-feed conveyor 102 is intermittently actuated in coordination with the intermittent motion of the paddle wheel 14 such that the food product in one of the food receiving pockets 110 of the in-feed conveyor 102 is delivered to one of the food receiving pockets of the paddle wheel 14. For example, the paddle wheel 14 can reach one of its intermittent stopping points where one of the food receiving pockets of the paddle wheel 14 is aligned with the food inlet 104 prior to when the in-feed conveyor 102 delivers the food product to the food receiving pocket of the paddle wheel 14.

The circumferential pasteurizer 100 also includes a reservoir 112 for the thermal medium. Fluid exits the vessel 12 through slots in the side wall of the vessel into the reservoir 112. The reservoir 112 can be, for example, relatively small and contain approximately 50% of the volume circulated in one minute. The circulation pump draws water from the reservoir then forces it through a filter and a heater and then back to the vessel through nozzles located in the side wall of the vessel. A signal from a level sensor in the reservoir can be used to open and close a valve as needed to maintain a constant level in the reservoir and thus replace water lost in the process.

Figure 6:
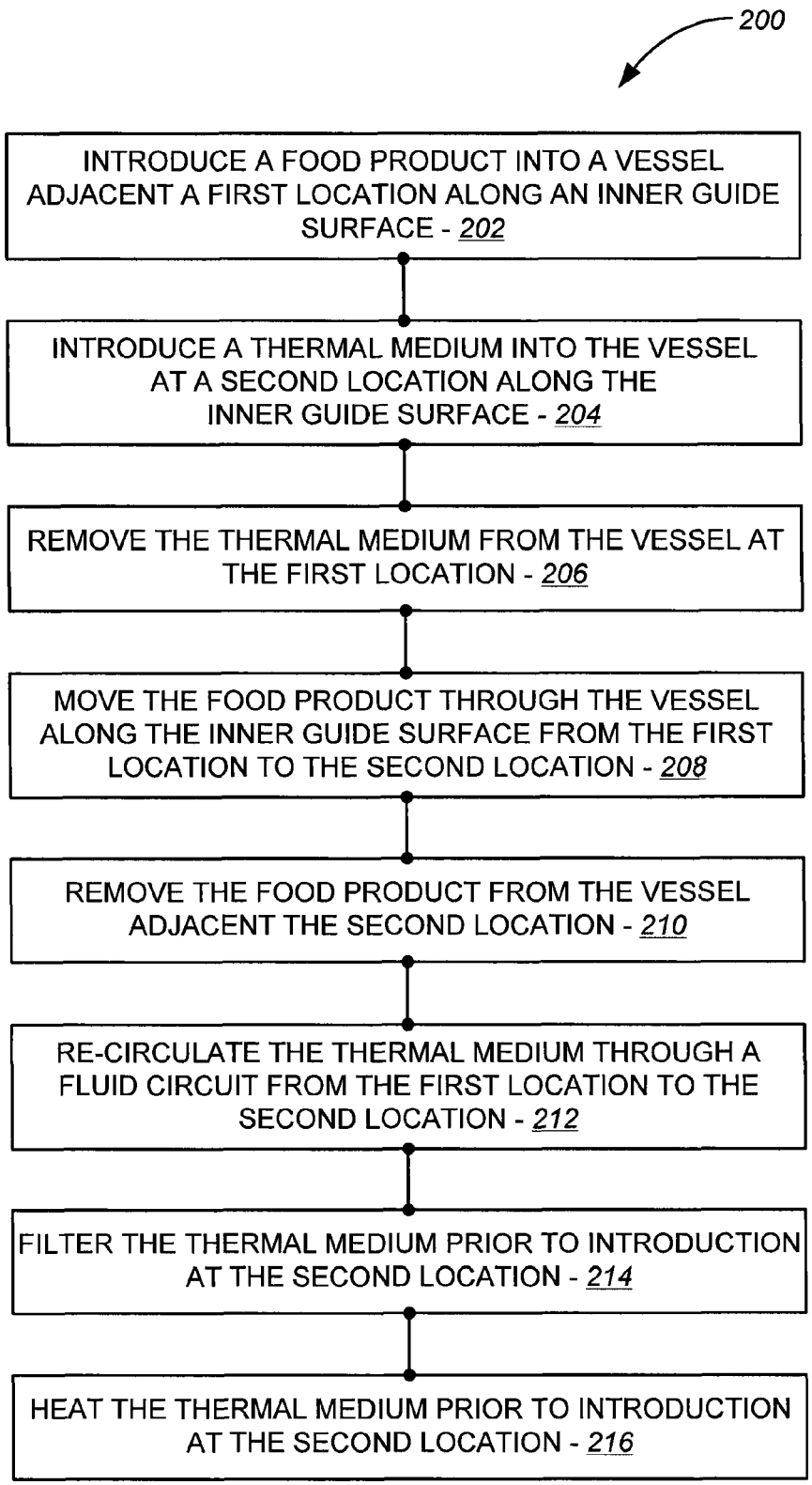
FIG. 6 illustrates a method for pasteurizing a food product, in accordance with many embodiments.

FIG. 6 shows steps of a method 200 for pasteurizing a food product, in accordance with many embodiments. The above-described circumferential pasteurizers 10, 100 can be configured for use in practicing the method 200. In step 202, a food product is introduced into a vessel adjacent a first location along an inner guide surface of the vessel. In step 204, a thermal medium is introduced into the vessel at a second location along the inner guide surface. In many embodiments, the thermal medium includes hot water and/or steam. In step 206, the thermal medium is removed from the vessel at the first location. In step 208, the food product is moved through the vessel along the inner guide surface from the first location to the second location. In many embodiments, the vessel inner guide surface has a cylindrical shape and a rotating paddle wheel is used to push the food product along the inner guide surface. In step 210, the food product is removed from the vessel adjacent the second location. Steps 202 through 210 result in a food product being moved from the first location to the second location while submerged in a thermal medium that is flowing from the second location to the first location. Such a counter flow of thermal medium relative to the direction of travel of the food product may provide for enhanced efficiency in pasteurizing the food product.

The thermal medium can be re-circulated from the first location to the second location. For example, in step 212, the thermal medium is re-circulated through a fluid circuit from the first location to the second location. In step 214, the thermal medium is filtered prior to introduction into the vessel at the second location. And in step 216, the thermal medium is heated prior to introduction into the vessel at the second location.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A circumferential pasteurizer comprising:
    a generally cylindrical vessel having an inner guide surface and configured to contain a thermal medium;
    a thermal medium inlet disposed on a first radial side of the vessel to inlet the thermal medium;

a thermal medium outlet disposed on a second radial side of the vessel diametrically opposite the first radial side to outlet the thermal medium;

a food product inlet disposed on the second radial side of the vessel to introduce a food product to be pasteurized;

a food product outlet disposed on the first radial side of the vessel to remove the food product after pasteurization; and a rotating paddle wheel suspended for rotation in the vessel through the thermal medium, the paddle wheel comprising a hub, and a plurality of paddles distributed around the hub and extending outwardly therefrom to adjacent the vessel inner guide surface to form food receiving pockets extending an axial length of the vessel to convey the food product in a circumferential direction from the food product inlet to the food product outlet along the vessel inner guide surface and counter to a flow of the thermal medium in an opposite circumferential direction from the thermal medium inlet to the thermal medium outlet, wherein both the food product and the thermal medium are axially bound by the axial length of the vessel for the duration of the food product being conveyed from the food product inlet to the food product outlet and for the duration of the flow of the thermal medium from the thermal medium inlet to the thermal medium outlet, respectively, such that the conveyance of the food product is generally in the circumferential direction only, and such that the flow of the thermal medium is generally in the opposite circumferential direction only.

2. The circumferential pasteurizer of claim 1, wherein the vessel inner guide surface comprises a cylindrical surface.

3. The circumferential pasteurizer of claim 1, further comprising a fluid circuit in fluid communication with the thermal medium inlet and the thermal medium outlet to re-circulate the thermal medium from the outlet to the inlet.

4. The circumferential pasteurizer of claim 3, wherein the fluid circuit comprises:

a pump;
a filter; and
a heat exchanger to add heat to the thermal medium.

5. The circumferential pasteurizer of claim 3, wherein the thermal medium inlet is configured to distribute the introduction of the thermal medium along the length of the vessel and the thermal medium outlet is configured to distribute the outlet of the thermal medium along the length of the vessel.

6. The circumferential pasteurizer of claim 5, wherein the fluid circuit further comprises:

an inlet manifold in direct fluid communication with the thermal medium inlet; and
an outlet manifold in direct fluid communication with the thermal medium outlet.

7. The circumferential pasteurizer of claim 1, wherein each of the paddles comprises a plurality of apertures configured for the thermal medium to flow therein.

8. The circumferential pasteurizer of claim 1, wherein each of the paddles comprises a plurality of outwardly extending members distributed along the length of the vessel separated by intermediate spaces.

9. The circumferential pasteurizer of claim 8, further comprising an extraction comb coupled with the vessel and disposed adjacent the food outlet, the extraction comb comprising a plurality of elongated curved members configured to pass through the intermediate spaces of the paddles as the paddle wheel rotates to extract the food product from the food receiving pockets.

10. The circumferential pasteurizer of claim 1, further comprising:

a food inlet chute communicating with the food product inlet; and
a food outlet chute communicating with the food product outlet.

11. The circumferential pasteurizer of claim 10, further comprising an inlet gate coupled with the food inlet chute to control the introduction of the food product through the food product inlet.

12. The circumferential pasteurizer of claim 1, further comprising an in-feed conveyor communicating with the food product inlet.

13. The circumferential pasteurizer of claim 10, further comprising an outlet gate coupled with the food outlet chute and configured to inhibit heat escape.

14. The circumferential pasteurizer of claim 10, further comprising a drive mechanism operatively coupled with the rotating paddle wheel and configured to intermittently rotate the paddle wheel through an angle corresponding to the distribution of the paddles around the hub to position one of the paddles to receive food product introduced through the food product inlet and to position one of the paddles to discharge food product through the food product outlet.

15. The circumferential pasteurizer of claim 14, wherein the paddles are oriented to align with the inlet chute when receiving the food product and align with the outlet chute when discharging the food product.

16. The circumferential pasteurizer of claim 14, wherein the drive mechanism comprises a ratchet to intermittently rotate the paddle wheel.

17. The circumferential pasteurizer of claim 14, further comprising an in-feed conveyor communicating with the food product inlet and configured to introduce the food product in timed coordination with the intermittent rotation of the paddle wheel.

18. A method for pasteurizing a food product, the method comprising:

introducing a thermal medium into a thermal medium inlet disposed on a first radial side of a generally cylindrical vessel having an inner guide surface;

removing the thermal medium from the vessel at a thermal medium outlet disposed on a second radial side of the vessel diametrically opposite the first radial side;

introducing a food product into a food product inlet disposed on the second radial side of the vessel;

pasteurizing the food product by moving the food product through the vessel along an inner guide surface of the vessel by using a rotating paddle wheel suspended for rotation in the vessel through the thermal medium, the paddle wheel comprising:

a hub, and a plurality of paddles distributed around the hub and extending outwardly therefrom to adjacent the vessel inner guide surface to form food receiving pockets extending an axial length of the vessel, wherein moving the food product through the vessel comprises conveying the food product, with the paddles, in a circumferential direction from the food product inlet to a food product outlet, disposed on the first radial side of the vessel, along the vessel inner guide surface and counter to a flow of the thermal medium in an opposite circumferential direction from the thermal medium inlet to the thermal medium outlet, wherein both the food product and the thermal medium are axially bound by the axial length of the vessel for the duration of the food product being conveyed from the food product inlet to the food product outlet and for the duration of the flow of the thermal medium from the thermal medium inlet to the thermal medium outlet, respectively, such that the conveyance of the food product is generally in the circumferential direction only, and such that the flow of the thermal medium is generally in the opposite circumferential direction only; and removing the food product from the vessel at the food product outlet.

19. The method of claim 18, further comprising re-circulating the thermal medium through a fluid circuit from the thermal medium outlet to the thermal medium inlet.

20. The method of claim 19, further comprising:

filtering the thermal medium prior to introduction at the thermal medium inlet; and heating the thermal medium prior to introduction at the thermal medium inlet.

\* \* \* \* \*